(12) United States Patent
Moon (10) Patent No.: US 11,536,339 B2
(45) Date of Patent: Dec. 27, 2022

(54) COOLING SYSTEM AND METHOD FOR AUXILIARY BRAKE DEVICE OF HYDROGEN FUEL CELL TRUCK

(71) Applicants: Hyundai Motor Company, Seoul (KR); Kia Motors Corporation, Seoul (KR)

(72) Inventor: Hyeon Chae Moon, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 159 days.

(21) Appl. No.: 17/167,023

(22) Filed: Feb. 3, 2021

(65) Prior Publication Data

US 2022/0082143 A1 Mar. 17, 2022

(30) Foreign Application Priority Data

Sep. 11, 2020 (KR) .................. 10-2020-0116501

(51) Int. Cl.

| | |
|---|---|
| *F16D 57/00* | (2006.01) |
| *F16D 65/78* | (2006.01) |
| *B60T 10/02* | (2006.01) |
| *B60L 7/24* | (2006.01) |
| *B60L 7/18* | (2006.01) |
| *B60L 7/26* | (2006.01) |
| *B60K 1/00* | (2006.01) |

(52) U.S. Cl.
CPC ............ *F16D 65/78* (2013.01); *B60L 7/18* (2013.01); *B60L 7/24* (2013.01); *B60L 7/26* (2013.01); *F16D 57/00* (2013.01); *B60K 2001/005* (2013.01); *F16D 2065/783* (2013.01); *F16D 2065/787* (2013.01)

(58) Field of Classification Search
CPC ...... B60T 13/585; B60T 13/586; B60T 10/02; B60L 7/10; B60L 7/18; B60L 7/24; B60L 7/26; F16D 57/00; F16D 57/02; F16D 57/04; F16D 57/06; F16D 65/78; F16D 2065/783; F16D 2065/787
USPC ........................................ 188/290, 293, 294
See application file for complete search history.

(56) References Cited

U.S. PATENT DOCUMENTS

| | | | | |
|---|---|---|---|---|
| 3,533,493 | A | * 10/1970 | Braun | ..... B60T 1/087 137/51 |
| 2010/0050635 | A1 | * 3/2010 | Bartosch | .......... F02G 5/00 60/616 |

FOREIGN PATENT DOCUMENTS

| | | | | |
|---|---|---|---|---|
| CN | 105736607 | A * | 7/2016 | ..... F16D 57/00 |
| CN | 108869589 | A * | 11/2018 | |

(Continued)

*Primary Examiner* — Thomas J Williams
(74) *Attorney, Agent, or Firm* — Morgan, Lewis & Bockius LLP (57) ABSTRACT

A cooling system and method for an auxiliary braking device of a hydrogen fuel cell truck, are provided in consideration that auxiliary braking force generated by the regenerative braking of the motor may be unnecessary and the brake resistor may be unnecessary when a sufficient amount of auxiliary braking force is generated alone by the operation of a retarder. A portion of thermal energy generated by the retarder is distributed to a stack cooling system so that the portion of thermal energy is removed by the stack cooling system. Accordingly, due to sufficient cooling of the retarder, a sufficient amount of auxiliary braking force is provided, and the brake resistor that has consumed surplus electrical energy generated by regenerative braking is removed.

17 Claims, 5 Drawing Sheets

(56) References Cited

FOREIGN PATENT DOCUMENTS

| | | | | |
|---|---|---|---|---|
| DE | 102012204140 A1 | * | 10/2012 | ............. F16D 1/101 |
| DE | 102013201787 A1 | * | 8/2014 | ............. B60T 10/02 |
| DE | 102013201789 A1 | * | 8/2014 | ............. B60T 10/02 |
| DE | 102018122702 A1 | * | 3/2020 | ............. B60T 1/087 |
| EP | 3225450 A1 | * | 10/2017 | ............. B60K 11/02 |
| GB | 2424474 A | * | 9/2006 | ............. B60H 1/005 |
| WO | WO-2014098711 A1 | * | 6/2014 | ............. B60T 10/02 |
| WO | WO-2015156721 A1 | * | 10/2015 | ............. B60T 10/02 |

* cited by examiner

FIG. 1

- Prior Art -

FIG. 2

- Prior Art -

COOLING SYSTEM AND METHOD FOR AUXILIARY BRAKE DEVICE OF HYDROGEN FUEL CELL TRUCK

CROSS REFERENCE TO RELATED APPLICATION

The present application claims priority to Korean Patent Application No. 10-2020-0116501, filed Sep. 11, 2020, the entire contents of which is incorporated herein for all purposes by this reference.

BACKGROUND OF THE INVENTION

Field of the Invention

The present invention relates generally to a cooling system and method for an auxiliary brake device of a hydrogen fuel cell truck. More particularly, the present invention relates generally to a cooling system and method for an auxiliary brake device of a hydrogen fuel cell truck, the cooling system and method being able to sufficiently cool a retarder, i.e., a type of an auxiliary braking device, and remove a brake resistor that has consumed surplus electrical energy generated by the regenerative braking of the motor.

DESCRIPTION OF RELATED ART

Commercial vehicles, such as large trucks, are provided with an auxiliary brake device, such as an exhaust brake, an engine brake, or a retarder, as a vehicle decelerating device providing auxiliary braking force to ensure safety while satisfying laws and regulations regarding auxiliary braking.

Hydrogen fuel cell trucks use auxiliary braking force resulting from the regenerative braking of the motor, in addition to auxiliary braking force generated by the above-stated auxiliary brake device.

That is, auxiliary braking force for decelerating a hydrogen fuel cell truck may be obtained as a sum of braking force generated by the operation of the retarder and the regenerative braking of the motor.

Furthermore, auxiliary braking force of the auxiliary braking device has been tested as an attempt to satisfy the laws and regulations regarding auxiliary braking. Such a test is referred to as a tractive force evaluation.

Such a tractive force evaluation refers to, for example, a test for evaluating whether or not a constant speed is maintained by the intervention of an auxiliary braking device (e.g., an exhaust brake, an engine brake, a retarder, or a regenerative braking device) when a vehicle having a weight of 26000 kg travels at the constant speed of 30 KPH by a driving distance of 6 km having a downhill inclination of 7%.

Figure 1:
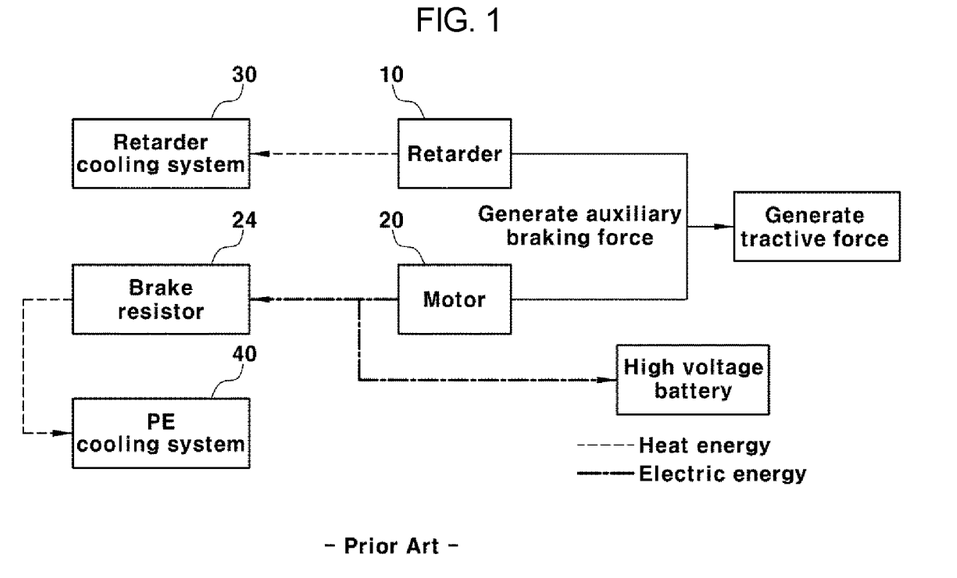
FIG. 1 illustrates a configuration for performing an evaluation test for the tractive force of a hydrogen fuel cell truck of the related art.

FIG. 1 illustrates a configuration for performing an evaluating test for the tractive force of a hydrogen fuel cell truck.

As illustrated in FIG. 1, auxiliary braking force when the tractive force of a hydrogen fuel cell truck is generated may be obtained as a sum of braking force generated by the operation of a retarder 10 and braking force resulting from the regenerative braking of the motor 20.

The retarder may be a hydraulic retarder (or fluid retarder) that performs deceleration by converting kinetic energy (i.e., rotational force) of a driveshaft, such as the output shaft of the transmission, into thermal energy using hydraulic resistance (or fluid resistance).

The retarder 10 is configured to decelerate the driveshaft, such as the output shaft of the transmission, using resistance of oil, i.e., fluid, injected into the internal space in which a rotor and stator housing is present.

When the retarder 10 operates, thermal energy is generated as frictional force caused by fluid resistance. The braking performance of the retarder 10 may not be enabled properly unless the frictional heat is sufficiently removed. Thus, the retarder 10 is cooled using a retarder cooling system 30.

At the same time that the motor 20 performs regenerative braking to provide auxiliary braking force, the motor 20 acts as a generator to generate electrical energy. Accordingly, a high voltage battery 22 is charged with the generated electrical energy.

Considering that the higher the state of charge of the high voltage battery 22 is, the higher the voltage is, the state of charge of the high voltage battery 22 mounted on a hydrogen fuel cell truck is limited to about 70%.

However, even when the state of charge of the high voltage battery 22 is about 70%, the regenerative braking of the motor configured for auxiliary braking may be maintained.

Thus, a brake resistor 24 is used to enable forced consumption of surplus electrical energy due to the regenerative braking of the motor while maintaining the regenerative braking of the motor to provide auxiliary braking force even when the state of charge of the high voltage battery is about 70%.

For example, to satisfy the tractive force evaluation, auxiliary braking force equal to a sum (A+B) kW of auxiliary braking energy A kW generated by the operation of the retarder 10 and auxiliary braking energy B kW generated by the regenerative braking of the motor may be applied for a predetermined time period (about 12 minutes). When the state of charge of the high voltage battery 22 is about 70%, surplus electrical energy generated during the regenerative braking may not be charged. Thus, the surplus electrical energy generated during the regenerative braking may be forced to be consumed by the brake resistor 24 (forced consumption).

The brake resistor 24 is a type of power electronic (PE), such as a motor of the vehicle or an inverter. The brake resistor 24 generates a large amount of thermal energy when the surplus electrical energy generated by the regenerative braking of the motor is forcibly consumed by heating.

Thus, considering that the performance of the brake resistor 24 may not be properly enabled unless thermal energy generated during the operation of the brake resistor 24 is sufficiently removed, the brake resistor 24 is cooled using a PE cooling system 40.

Figure 2:
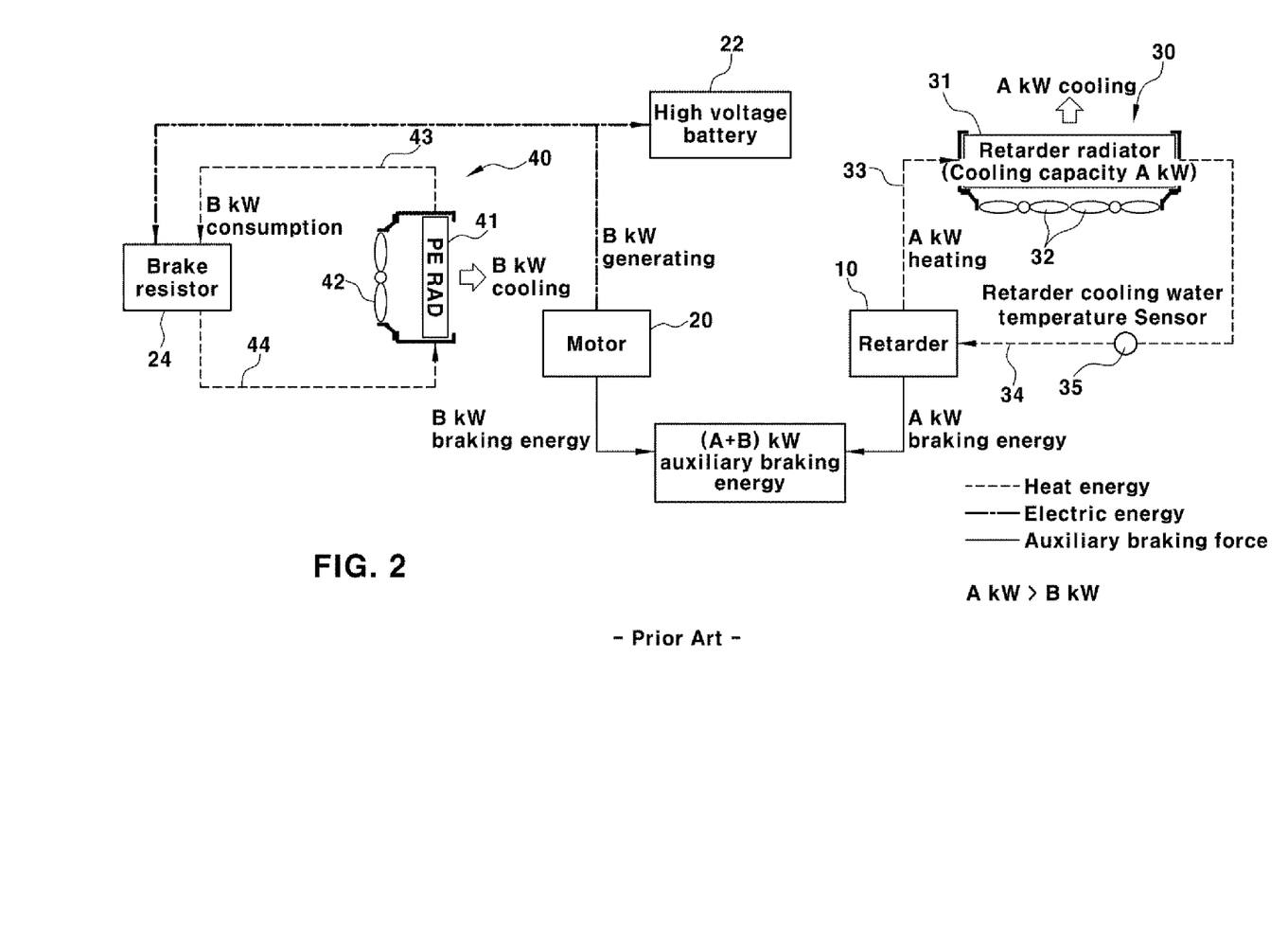
FIG. 2 is a schematic diagram illustrating a retarder cooling system and a PE cooling system of the related art.

FIG. 2 is a schematic diagram illustrating a retarder cooling system and a PE cooling system of the related art.

The retarder cooling system 30 is provided to remove heat energy, i.e., frictional heat, generated during the operation of the retarder 10. The retarder cooling system 30 includes a retarder radiator 31, a cooling fan 32, a first cooling water supply line 33 connected to an outlet side of the retarder 10 and an inlet side of the retarder radiator 31, a first cooling water discharge line 34 connected to an outlet side of the retarder radiator 31 and an inlet side of the retarder 10, a retarder cooling water temperature sensor 35 mounted on the first cooling water discharge line 34, and the like.

Accordingly, retarder cooling water having the thermal energy (e.g., thermal energy A kW) generated during the operation of the retarder 10 is supplied to the retarder radiator 31 through the first cooling water supply line 33, is cooled by the retarder radiator 31, and accordingly, is circulated to the retarder 10 through the first cooling water discharge line 34, so that the retarder 10 may be cooled.

Due to the cooling the retarder 10 in the present manner, the braking performance of the retarder 10 may be properly enabled. Accordingly, the retarder 10 may easily realize the auxiliary braking force corresponding to the auxiliary braking energy A kW.

The PE cooling system 40 is provided to cool the motor and the inverter, i.e., power electronics (PEs) while simultaneously removing thermal energy generated during the operation of the brake resistor 24. The PE cooling system 40 includes a PE radiator 41, a cooling fan 42, a second cooling water supply line 43 connected to an outlet side of the brake resistor 24 and an inlet side of the PE radiator 41, a second cooling water discharge line 44 connected to an outlet side of the PE radiator 41 and an inlet side of the brake resistor 24, and the like.

Thus, when the state of charge of the high voltage battery 22 is about 70%, i.e., the charge limit, the brake resistor 24 causes forced consumption of the surplus electrical energy due to the regenerative braking of the motor 20.

Here, PE cooling water having thermal energy (e.g., thermal energy having B kW) generated during the operation of the brake resistor 24 is supplied to the PE radiator 41, is cooled by the PE radiator 41, and then is circulated to the brake resistor 24 through the second cooling water discharge line 44, so that the brake resistor 24 may be cooled.

However, there is a problem that the brake resistor 24 is an inefficient component in terms of energy management since the brake resistor 24 may be cooled by the PE cooling system 40. Furthermore, the brake resistor 24 is significantly expensive and thus is disadvantageous in terms of cost.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Accordingly, the present invention has been made keeping in mind the above problems occurring, considering that auxiliary braking force generated by the regenerative braking of the motor may be unnecessary and the brake resistor may be unnecessary when a sufficient amount of auxiliary braking force is generated alone by the operation of a retarder, i.e., a type of an auxiliary braking device.

Various aspects of the present invention are directed to providing a cooling system and method for an auxiliary braking device of a hydrogen fuel cell truck, the cooling system and method being able to distribute a portion of thermal energy generated by the retarder to a stack cooling system so that the portion of thermal energy is removed by the stack cooling system. Accordingly, due to sufficient cooling of the retarder, a sufficient amount of auxiliary braking force may be provided, and the brake resistor that has consumed surplus electrical energy generated by regenerative braking may be removed.

In various aspects of the present invention, there is provided a cooling system for an auxiliary braking device of a hydrogen fuel cell truck. The cooling system may include: a retarder radiator configured for cooling thermal energy generated during operation of a retarder of the vehicle; a first cooling fluid supply line connected to an outlet side of the retarder and an inlet side of the retarder radiator; a first cooling fluid discharge line connected to an outlet side of the retarder radiator and the inlet side of the retarder; a retarder cooling fluid temperature sensor mounted on the first cooling fluid discharge line; a three-way valve mounted on the first cooling fluid discharge line, between the retarder cooling fluid temperature sensor and the retarder; a heat exchanger facilitating cold cooling fluid to circulate from a stack cooling system; a first cooling fluid branch line connected to the three-way valve and an inlet of the heat exchanger; and a first cooling fluid return line connected to an outlet of the heat exchanger and a portion of the first cooling fluid discharge line between the three-way valve and the retarder.

The stack cooling system may include: a stack radiator and an electric fan configured for cooling stack cooling fluid to cool a fuel cell stack of the vehicle; a third cooling fluid supply line connected to an outlet side of the fuel cell stack and an inlet side of the stack radiator; an electric water pump mounted on the third cooling fluid supply line; a third cooling fluid discharge line connected to an outlet side of the stack radiator and to an inlet side of the fuel cell stack; a second cooling fluid branch line branched from the third cooling fluid discharge line and connected to the heat exchanger; and a second cooling fluid return line connected to the heat exchanger and the third cooling fluid supply line.

Conductive lines configured for allowing surplus electrical energy generated by regenerative braking of the motor to be consumed may be connected to the electric fan and the electric water pump.

The cooling system may further include a retarder cooling controller configured for controlling the three-way valve to be opened toward the first cooling fluid branch line when the retarder is operating and a temperature of the cooling fluid detected by the retarder cooling fluid temperature sensor is higher than a predetermined temperature.

When the retarder is operating and the temperature of the cooling fluid detected by the retarder cooling fluid temperature sensor is higher than the predetermined temperature, the retarder cooling controller may perform a control operation of applying an up-shift signal to an electric fan of the stack cooling system to increase an air volume.

The cooling system may further include a stack cooling controller performs a control operation of applying an up-shift signal to the electric water pump of the stack cooling system to increase a flow rate, in a response to a cooperative control signal of the retarder cooling controller, when the retarder is operating and a temperature of the cooling fluid detected by the retarder cooling fluid temperature sensor is higher than a predetermined temperature.

According to various aspects of the present invention, there is provided a cooling method for an auxiliary braking device of a hydrogen fuel cell truck. The cooling method may include: determining whether or not a retarder is operating and comparing a temperature of retarder cooling fluid with a predetermined temperature; when the retarder is operating and the temperature of the retarder cooling fluid detected by a retarder cooling fluid temperature sensor is higher than a predetermined torque value, supplying the retarder cooling fluid that has been flowing from a retarder radiator to the retarder, to a heat exchanger in which cold cooling fluid from a stack cooling system is flowing, cooling the retarder cooling fluid through heat exchange therebetween; and supplying the retarder cooling fluid cooled in the heat exchanger to the retarder to cool the retarder.

When the retarder is operating and the temperature of the retarder cooling fluid detected by the retarder cooling fluid temperature sensor is higher than the predetermined torque value, a three-way valve may be controlled to be opened toward a first cooling fluid branch line by a control signal of a retarder cooling controller, so that the retarder cooling fluid that has been flowing from the retarder radiator to the retarder is supplied to the heat exchanger through the first cooling fluid branch line.

The cooling method may further include, when the retarder is operating and the temperature of the retarder cooling fluid detected by the retarder cooling fluid temperature sensor is higher than the predetermined torque value, applying, by a retarder cooling controller, an up-shift signal to an electric fan of the stack cooling system to increase an air volume.

The electric fan may be driven by consuming surplus electrical energy generated by regenerative braking of the motor, so that auxiliary braking force is additionally generated in a response to the regenerative braking of the motor.

The cooling method may further include applying, by a stack cooling controller, an up-shift signal to an electric water pump of the stack cooling system to increase a flow rate, in a response to a cooperative control signal of the retarder cooling controller, when the retarder is operating and the temperature of retarder cooling fluid detected by the retarder cooling fluid temperature sensor is higher than the predetermined temperature.

The electric water pump may be driven by consuming surplus electrical energy generated by regenerative braking of the motor, so that auxiliary braking force is additionally generated in a response to the regenerative braking of the motor.

As described above, various aspects of the present invention provide the following effects.

First, a portion of thermal energy generated by the retarder may be distributed to a stack cooling system to be cooled by the stack cooling system. In the present manner, the retarder may be sufficiently cooled, and the operation of the retarder alone may provide a sufficient amount of auxiliary braking force such that auxiliary braking force generated by the regenerative braking of the motor is unnecessary.

Second, since the operation of the retarder alone may provide a sufficient amount of auxiliary braking force such that auxiliary braking force generated by the regenerative braking of the motor is unnecessary, the expensive brake resistor that has consumed surplus electrical energy generated by the regenerative braking of the motor may be removed, reducing fabrication costs and the number of components.

Third, since the electric fan, the electric water pump, and the like of the stack cooling system consume the surplus electrical energy generated by the regenerative braking of the motor, auxiliary braking force generated by the regenerative braking of the motor may be added to auxiliary braking force that has been provided by the operation of the retarder alone, improving the auxiliary braking performance.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, example embodiments of the present invention will be described in detail with reference to the accompanying drawings.

Figure 3:
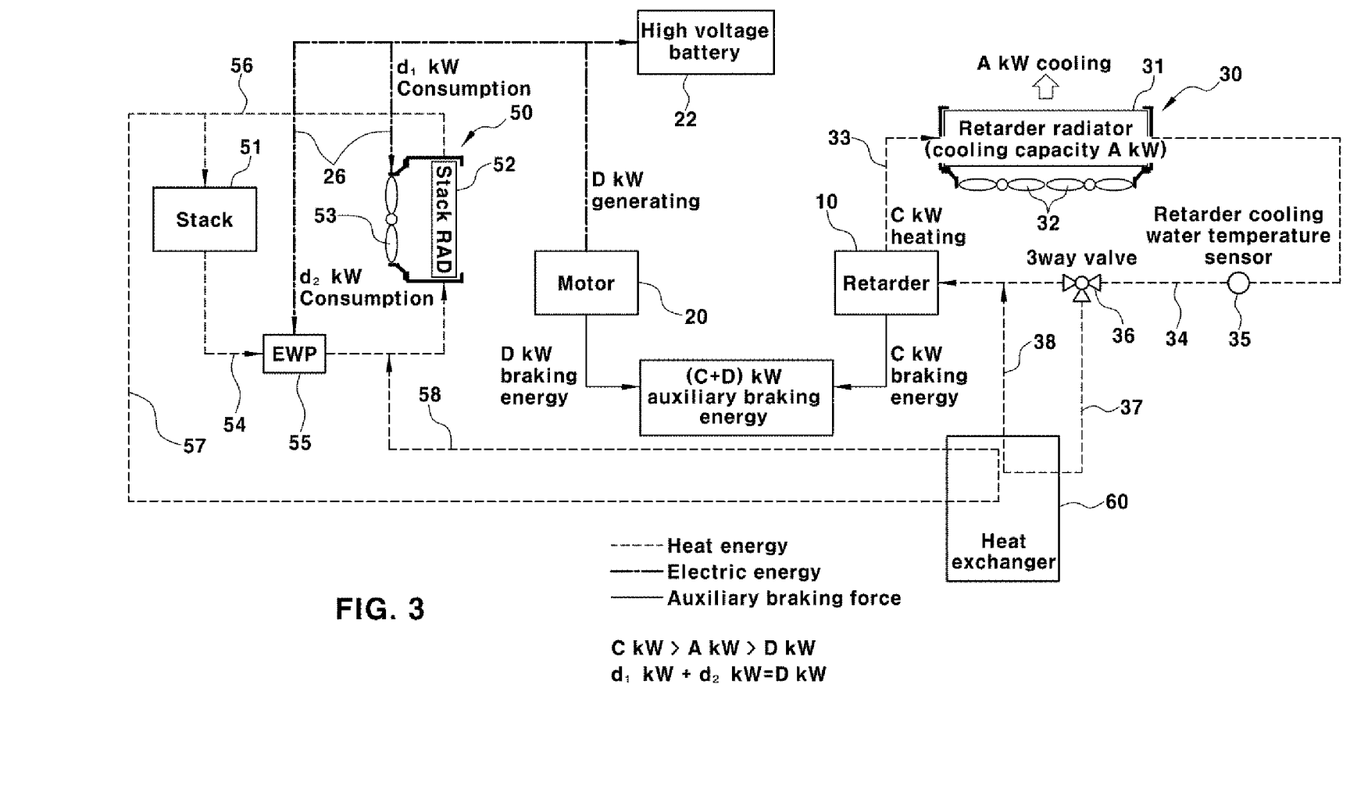
FIG. 3 is a schematic diagram illustrating a cooling system for an auxiliary braking device of a hydrogen fuel cell truck according to various exemplary embodiments of the present invention.
Figure 4:
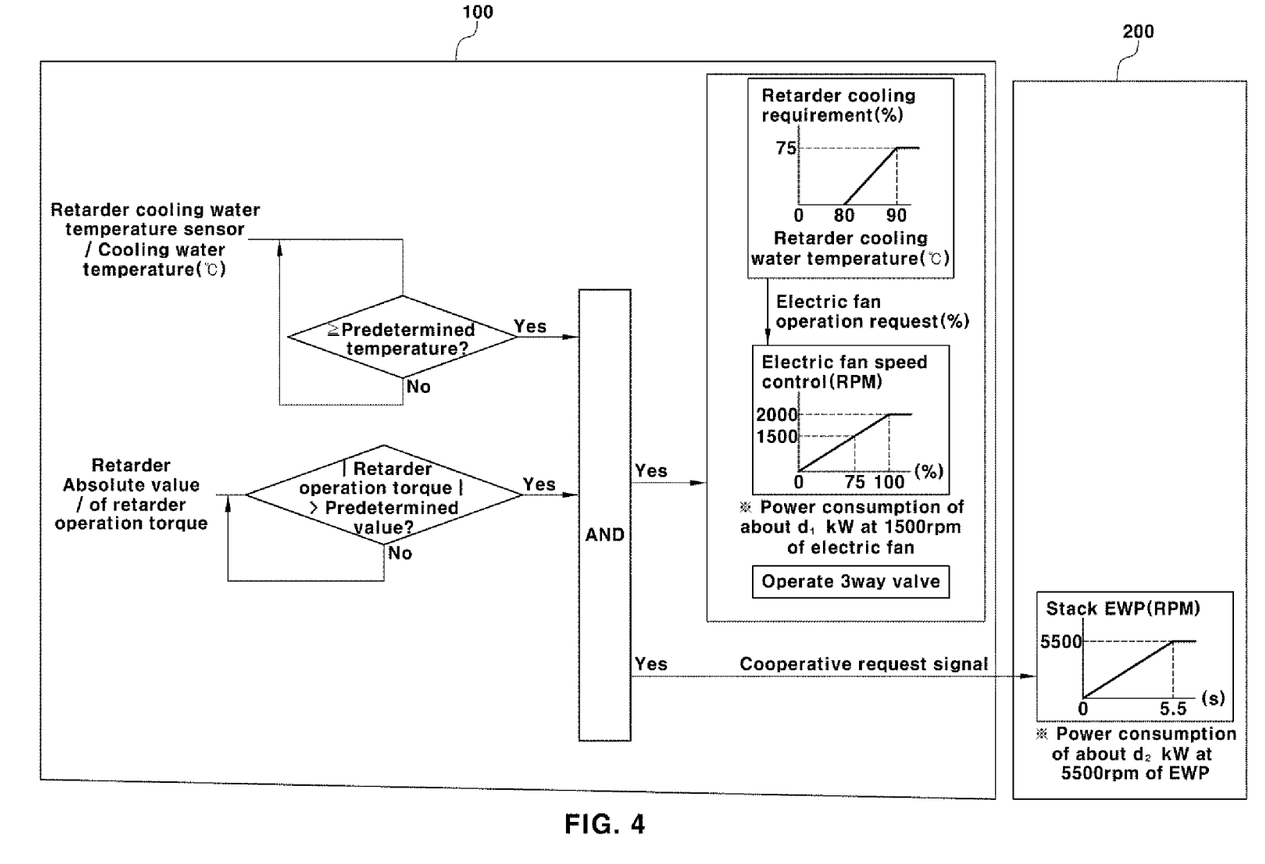
FIG. 4 is a diagram illustrating a configuration for controlling the cooling system for an auxiliary braking device of a hydrogen fuel cell truck according to various exemplary embodiments of the present invention.

FIG. 3 is a schematic diagram illustrating a cooling system for an auxiliary braking device of a hydrogen fuel cell truck according to various exemplary embodiments of the present invention, and FIG. 4 is a diagram illustrating a configuration for controlling the cooling system for an auxiliary braking device of a hydrogen fuel cell truck according to various exemplary embodiments of the present invention.

In FIG. 3, reference numeral 10 indicates a retarder.

A hydrogen fuel cell truck may be decelerated by auxiliary braking force generated by the operation of the retarder 10 even in the case that a main brake is not pressed during the traveling of the hydrogen fuel cell truck.

When the retarder 10 operates, thermal energy is generated as frictional force caused by hydraulic resistance (or fluid resistance). The braking performance of the retarder 10 may not be enabled properly unless the frictional heat is sufficiently removed. Thus, the retarder 10 is cooled using a retarder cooling system 30.

The retarder cooling system 30 includes a retarder radiator 31 and a cooling fan 32 to remove thermal energy generated during the operation of the retarder 10, a first cooling fluid supply line 33 connected to an outlet side of the retarder 10 and an inlet side of the retarder radiator 31, a first cooling fluid discharge line 34 connected to an outlet side of the retarder radiator 31 and an inlet side of the retarder 10, a retarder cooling fluid temperature sensor 35 mounted on the first cooling fluid discharge line 34, and the like.

Accordingly, retarder cooling fluid having the thermal energy (e.g., thermal energy C kW) generated during the operation of the retarder 10 is supplied to the retarder radiator 31 through the first cooling fluid supply line 33, is cooled by the retarder radiator 31, and then, is circulated to the retarder 10 through the first cooling fluid discharge line 34, so that the retarder 10 may be cooled.

Here, when auxiliary braking force corresponding to auxiliary braking energy C kW is generated by the operation of the retarder 10 alone and is the same as the sum (A+B) kW of the above-described auxiliary braking energy, and at the same time, the thermal energy C kW generated during the operation of the retarder 10 is sufficiently removed, a sufficient amount of auxiliary braking force may be obtained such that auxiliary braking force generated by the regenerative braking of the motor is unnecessary.

However, when the cooling capacity of the retarder radiator 31 is an insufficient amount A kW, the thermal energy (e.g., thermal energy C kW) generated during the operation of the retarder 10 may not be sufficiently removed.

Accordingly, an objective of the present invention is to sufficiently remove the thermal energy (e.g., thermal energy C kW) generated during the operation of the retarder 10 using a stack cooling system 50.

In this regard, a three-way valve 36 is mounted on a portion of the first cooling fluid discharge line 34, between the retarder cooling fluid temperature sensor 35 and the retarder 10. Furthermore, a heat exchanger 60 facilitating cold cooling fluid to circulate from the stack cooling system 50 is provided.

The heat exchanger 60 may be a typical plate heat exchanger in which a plurality of plates forming two or more cooling fluid channels therein is provided in the interior of the plate heat exchanger. Heat exchange may be performed using the difference between the temperature of cooling fluid flowing through one of the two cooling fluid channels between the plates and the temperature of cooling fluid flowing through the other of the two cooling fluid channels (e.g., the difference between the temperature of hot retarder cooling fluid and the temperature of cold stack cooling fluid).

Furthermore, a first cooling fluid branch line 37 is connected to the three-way valve 36 and an inlet of the heat exchanger 60, and a first cooling fluid return line 38 is connected to an outlet of the heat exchanger 60 and a portion of the first cooling fluid discharge line 34 between the three-way valve 36 and the retarder 10.

Furthermore, the stack cooling system 50 includes a stack radiator 52 and an electric fan 53 cooling stack cooling fluid to cool a fuel cell stack 51, a third cooling fluid supply line 54 connected to an outlet side of the fuel cell stack 51 and an inlet side of the stack radiator 52, an electric water pump 55 mounted on the third cooling fluid supply line 54, and a third cooling fluid discharge line 56 connected to an outlet side of the stack radiator 52 and an inlet side of the fuel cell stack 51.

Furthermore, a second cooling fluid branch line 57 through which cold cooling fluid flows is connected to the third cooling fluid discharge line 56 and the heat exchanger 60. A second cooling fluid return line 58 is connected to the heat exchanger 60 and the third cooling fluid supply line 54 such that cold stack cooling fluid returns through the second cooling fluid return line 58 after heat exchange.

Accordingly, stack cooling fluid that has cooled the fuel cell stack 51 enters the stack radiator 52 through the third cooling fluid supply line 54 to be cooled and converted to cold cooling fluid. Sequentially, cold stack cooling fluid recirculates to the fuel cell stack 51 through the third cooling fluid discharge line 56 so that the fuel cell stack 51 may be cooled, and at the same time, is supplied to the heat exchanger 60 through the second cooling fluid branch line 57.

The cooling system for an auxiliary braking device according to various exemplary embodiments of the present invention includes a retarder cooling controller 100 and a stack cooling controller 200, as illustrated in FIG. 4, as cooling controllers.

The stack cooling controller 200 may be a vehicle control unit (VCU) provided as an upper level controller of the hydrogen fuel cell truck. The stack cooling controller 200 may be a fuel cell control unit (FCU) controlling a fuel cell system.

When the retarder 10 is operating and the temperature of the cooling fluid detected by the retarder cooling fluid temperature sensor 35 is higher than a predetermined temperature (e.g., 80° C.), the retarder cooling controller 100 controls the three-way valve 36 to be opened toward the first cooling fluid branch line.

Furthermore, when the retarder 10 is operating and the temperature of the cooling fluid detected by the retarder cooling fluid temperature sensor 35 is higher than the predetermined temperature, the retarder cooling controller 100 performs a control operation of applying an up-shift signal to the electric fan 53 of the stack cooling system 50 to increase the air volume.

When the retarder 10 is operating and the temperature of the cooling fluid detected by the retarder cooling fluid temperature sensor 35 is higher than the predetermined temperature, the stack cooling controller 200 performs a control operation of applying an up-shift signal to the electric water pump 55 of the stack cooling system to increase the flow rate, in a response to a cooperative control signal of the retarder cooling controller.

Figure 5:
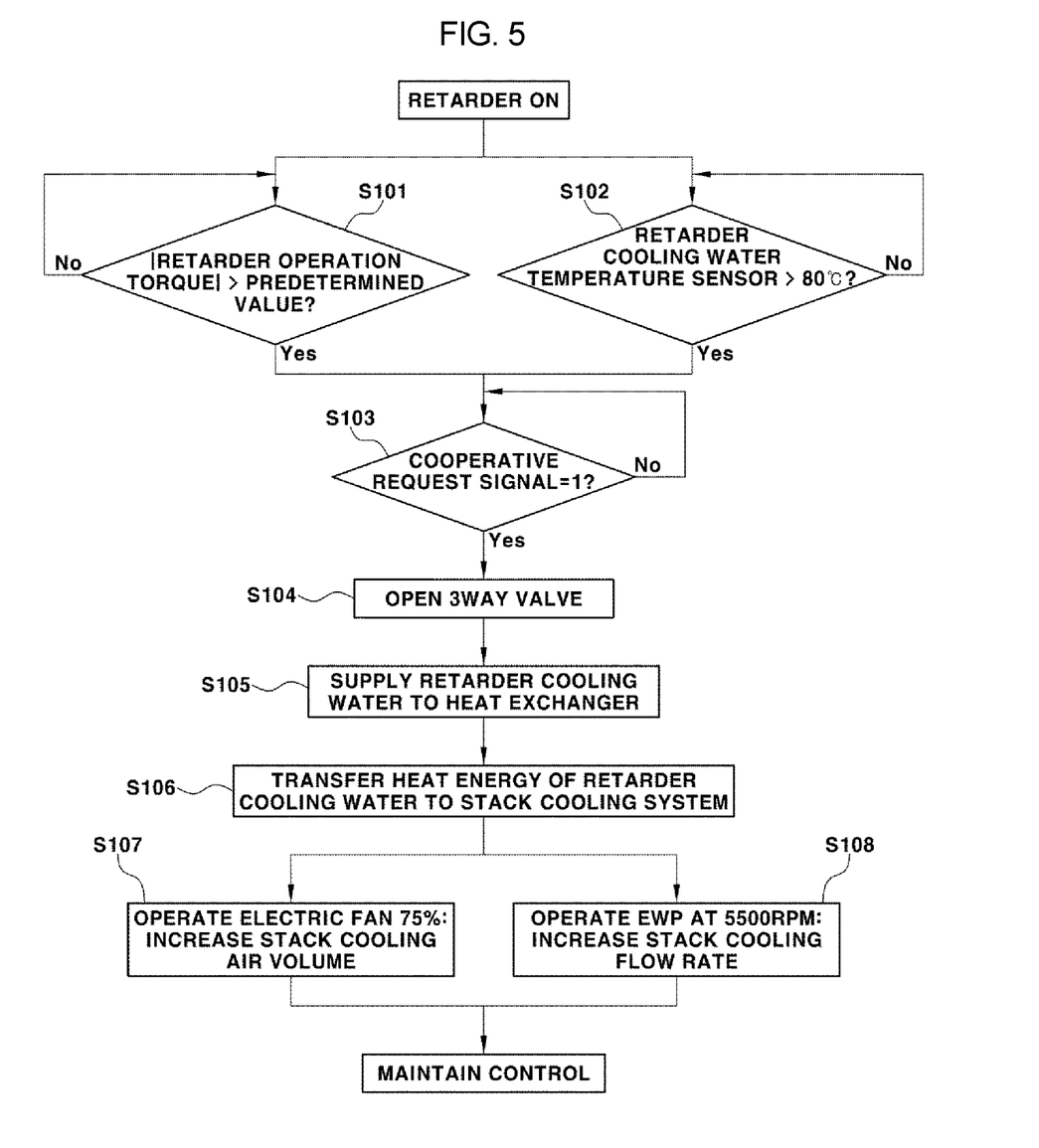
FIG. 5 is a flowchart illustrating a process of controlling the cooling system for an auxiliary braking device of a hydrogen fuel cell truck according to various exemplary embodiments of the present invention.

Hereinafter, an operation flow of the cooling system for an auxiliary braking device according to various exemplary embodiments of the present invention having the above-described configuration will be described with reference to FIG. 3, FIG. 4, and FIG. 5.

First, step S101 of determining, by the retarder cooling controller 100, whether or not the retarder 10 is operating and step S102 of comparing the temperature of cooling fluid of the retarder 10 with a predetermined temperature are performed.

The step of determining whether or not the retarder 10 is operating is performed by comparing the absolute value of a retarder operation torque indicating a negative torque value for auxiliary braking with a predetermined torque value. When the absolute value of the retarder operation torque indicating the negative torque value is greater than the predetermined torque value as a result of the comparison, the retarder is determined to be operating.

The step of comparing the temperature of cooling fluid of the retarder 10 with the predetermined temperature is performed by comparing the temperature of the cooling fluid detected by the retarder cooling fluid temperature sensor 35 with the predetermined torque value (e.g., 80° C.).

When the retarder 10 is operating and the temperature of the cooling fluid detected by the retarder cooling fluid temperature sensor 35 is higher than the predetermined torque value, the retarder cooling controller 100 transmits a cooperative control signal to the cooling controller 200 in S103.

Furthermore, when the retarder 10 is operating and the temperature of the cooling fluid detected by the retarder cooling fluid temperature sensor 35 is higher than the predetermined torque value, the retarder cooling controller 100 controls the three-way valve 36 to be opened toward the first cooling fluid branch line 37 in S104.

Since the cooling capacity A kW of the retarder radiator 31 may not sufficiently remove thermal energy (e.g., thermal energy C kW) generated during the operation of the retarder 10, the retarder cooling controller 100 controls the three-way valve 36 to be opened toward the first cooling fluid branch line 37 to sufficiently remove the thermal energy C kW generated during the operation of the retarder 10.

Accordingly, retarder cooling fluid that has been flowing from the retarder radiator 31 to the retarder 10 through the first cooling fluid discharge line 34 is supplied to the heat exchanger 60 by passing through the three-way valve 36 and through the first cooling fluid branch line 37 in S105.

As described above, cold stack cooling fluid from the second cooling fluid branch line 57 of the stack cooling system 50 circulates through the heat exchanger 60.

Thus, retarder cooling fluid that has been flowing from the retarder radiator 31 to the retarder, i.e., retarder cooling fluid supplied to the heat exchanger 60, after having passed through the three-way valve 36 and through the first cooling fluid branch line 37 is easily cooled by heat exchange with cold stack cooling fluid circulating from the second cooling fluid branch line 57 of the stack cooling system 50 to the heat exchanger 60 and then is supplied to the retarder 10 through the first cooling fluid return line 38, so that the retarder 10 may be sufficiently cooled.

For example, the thermal energy C kW generated during the operation of the retarder 10 may be sufficiently removed, so that auxiliary braking force corresponding to the auxiliary braking energy C kW may be continuously generated by the operation of the retarder 10 alone.

Here, stack cooling fluid that has absorbed thermal energy from retarder cooling fluid in the heat exchanger 60 is transferred to the stack cooling system 50 to enable cooling in S106.

That is, after the temperature of cold stack cooling fluid that has circulated from the second cooling fluid branch line 57 of the stack cooling system 50 to the heat exchanger 60 is raised through heat exchange with retarder cooling fluid in the heat exchanger 60, the stack cooling fluid flows to the third cooling fluid supply line 54 through the second cooling fluid return line 58 and then is supplied to the stack radiator 52 to be cooled.

Since the temperature of the stack cooling fluid is raised through heat exchange with the retarder cooling fluid, it is necessary to rapidly cool the stack cooling fluid.

In this regard, the retarder cooling controller 100 performs a control operation of applying an up-shift signal to the electric fan 53 of the stack cooling system 50 to increase an air volume.

Furthermore, in a response to a cooperative control signal transmitted by the retarder cooling controller 100 to the stack cooling controller 200, the stack cooling controller 200 performs the control operation of applying the up-shift signal to the electric water pump 55 of the stack cooling system 50 to increase a flow rate.

Consequently, in S107, the output of the electric fan 53 may be increased (e.g., to 75% of the maximum output level), so that the air volume for cooling the stack cooling fluid may be increased. At the same time, in S108, the output of the electric water pump 55 may be increased so that the RPM of the electric water pump 55 is increased (e.g., to 5500 rpm), increasing the flow rate of stack cooling fluid cooled by the stack radiator 52.

As described above, the retarder cooling fluid having the thermal energy generated by the retarder 10 may be cooled through heat exchange with the stack cooling fluid of the stack cooling system 50, so that the retarder 10 may be sufficiently cooled and the operation of the retarder 10 alone may provide a sufficient amount of auxiliary braking force such that auxiliary braking force generated by the regenerative braking of the motor is unnecessary.

Since the operation of the retarder 10 alone may provide a sufficient amount of auxiliary braking force such that auxiliary braking force generated by the regenerative braking of the motor is unnecessary, an expensive brake resistor of the related art that has consumed surplus electrical energy generated by the regenerative braking of the motor may be removed, reducing fabrication costs and the number of components.

Furthermore, conductive lines 26 (see FIG. 3) may be connected to the electric fan 53 and the electric water pump 55 from among the components of the stack cooling system 50. Through the conductive lines 26, surplus electrical energy generated by the regenerative braking of the motor 20 may be consumed to assist in the consumption of power with increases in the output of the electric fan 53 and the electric water pump 55.

Thus, the electric fan 53 may be driven by consuming the surplus electrical energy generated by the regenerative braking of the motor 20, and the electric water pump 55 may be driven by consuming the surplus electrical energy generated by the regenerative braking of the motor 20.

Here, when the motor 20 is performing the regenerative braking while generating the surplus electrical energy consumed by the electric fan 53 and the electric water pump 55, auxiliary braking force may be additionally generated.

For example, when the state of charge of the high voltage battery 22 is increased to a charge limit (i.e., about 70%), surplus electrical energy $D(d_1+d_2)$ kW equal to a sum of $d_1$ kW consumed by the electric fan 53 and $d_2$ kW consumed by the electric water pump 55 is generated during the regenerative braking of the motor 20. Thus, auxiliary braking force corresponding to auxiliary braking energy D kW may be additionally generated.

Accordingly, as described above, auxiliary braking force equal to a sum (C+D) kW of auxiliary braking energy C kW generated by the operation of the retarder 10 and auxiliary braking energy D kW generated by the regenerative braking of the motor may be applied.

As set forth above, surplus electrical energy generated by the regenerative braking of the motor may be consumed by the electric fan and the electric water pump of the stack cooling system, so that auxiliary braking force generated by the regenerative braking of the motor may be generated in addition to auxiliary braking force generated by the operation of the retarder alone, improving the auxiliary braking performance.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cooling system for an auxiliary braking device of a vehicle, the cooling system comprising:
    a retarder radiator configured for cooling thermal energy generated during an operation of a retarder of the vehicle;
    a first cooling fluid supply line connected to an outlet side of the retarder and an inlet side of the retarder radiator;
    a first cooling fluid discharge line connected to an outlet side of the retarder radiator and the inlet side of the retarder;
    a retarder cooling fluid temperature sensor mounted on the first cooling fluid discharge line;
    a three-way valve mounted on the first cooling fluid discharge line, between the retarder cooling fluid temperature sensor and the retarder;
    a heat exchanger enabling cooling fluid to circulate from a stack cooling system;
    a first cooling fluid branch line connected to the three-way valve and an inlet of the heat exchanger; and
    a first cooling fluid return line connected to an outlet of the heat exchanger and a portion of the first cooling fluid discharge line between the three-way valve and the retarder.

2. The cooling system of claim 1, wherein the stack cooling system includes:
    a stack radiator and an electric fan configured for cooling stack cooling fluid to cool a fuel cell stack of the vehicle;
    a third cooling fluid supply line connected to an outlet side of the fuel cell stack and an inlet side of the stack radiator;
    an electric pump mounted on the third cooling fluid supply line;
    a third cooling fluid discharge line connected to an outlet side of the stack radiator and to an inlet side of the fuel cell stack;
    a second cooling fluid branch line branched from the third cooling fluid discharge line and connected to the heat exchanger; and
    a second cooling fluid return line connected to the heat exchanger and the third cooling fluid supply line.

3. The cooling system of claim 2, wherein conductive lines configured for allowing surplus electrical energy generated by regenerative braking of a motor of the vehicle to be consumed are connected to the electric fan and the electric pump.

4. The cooling system of claim 1, further including a retarder cooling controller configured for controlling the three-way valve to be opened toward the first cooling fluid branch line upon determining that the retarder is operating and a temperature of the cooling fluid detected by the retarder cooling fluid temperature sensor is higher than a predetermined temperature.

5. The cooling system of claim 4, wherein, upon determining that the retarder is operating and the temperature of the cooling fluid detected by the retarder cooling fluid temperature sensor is higher than the predetermined temperature, the retarder cooling controller is configured to perform a control operation of applying an up-shift signal to an electric fan of the stack cooling system to increase an air volume.

6. The cooling system of claim 5, wherein the electric fan is driven by consuming surplus electrical energy generated by regenerative braking of a motor of the vehicle, so that auxiliary braking force is additionally generated in a response to the regenerative braking of the motor.

7. The cooling system of claim 1, further including a stack cooling controller configured to perform a control operation of applying an up-shift signal to an electric pump of the stack cooling system to increase a flow rate, in a response to a cooperative control signal of a retarder cooling controller, upon determining that the retarder is operating and a temperature of the cooling fluid detected by the retarder cooling fluid temperature sensor is higher than a predetermined temperature.

8. The cooling system of claim 7, wherein the electric pump is driven by consuming surplus electrical energy generated by regenerative braking of a motor, so that auxiliary braking force is additionally generated in a response to the regenerative braking of the motor.

9. A cooling method of controlling a cooling system for an auxiliary braking device of a vehicle, the cooling method comprising:
determining, by a retarder cooling controller, whether a retarder of the vehicle is operating and comparing, by the retarder cooling controller, a temperature of retarder cooling fluid with a predetermined temperature;
upon determining that the retarder is operating and the temperature of the retarder cooling fluid detected by a retarder cooling fluid temperature sensor mounted on a first cooling fluid discharge line connected to the retarder and a retarder radiator is higher than a predetermined torque value, supplying the retarder cooling fluid that has been flowing from the retarder radiator to the retarder, to a heat exchanger in which cooling fluid from a stack cooling system is flowing, cooling the retarder cooling fluid through heat exchange therebetween; and
supplying the retarder cooling fluid cooled in the heat exchanger to the retarder to cool the retarder.

10. The cooling method of claim 9, wherein, upon determining that the retarder is operating and the temperature of the retarder cooling fluid detected by the retarder cooling fluid temperature sensor is higher than the predetermined torque value, a three-way valve is controlled by the retarder cooling controller to be opened toward a first cooling fluid branch line branched from the first cooling fluid discharge line, so that the retarder cooling fluid that has been flowing from the retarder radiator to the retarder is supplied to the heat exchanger through the first cooling fluid branch line.

11. The cooling method of claim 9, further including, upon determining that the retarder is operating and the temperature of the retarder cooling fluid detected by the retarder cooling fluid temperature sensor is higher than the predetermined torque value, applying, by the retarder cooling controller, an up-shift signal to an electric fan of the stack cooling system to increase an air volume.

12. The cooling method of claim 11, wherein the electric fan is driven by consuming surplus electrical energy generated by regenerative braking of a motor of the vehicle, so that auxiliary braking force is additionally generated in a response to the regenerative braking of the motor.

13. The cooling method of claim 9, further including applying, by a stack cooling controller, an up-shift signal to an electric pump of the stack cooling system to increase a flow rate, in a response to a cooperative control signal of the retarder cooling controller, upon determining that the retarder is operating and the temperature of retarder cooling fluid detected by the retarder cooling fluid temperature sensor is higher than the predetermined temperature.

14. The cooling method of claim 13, wherein the electric pump is driven by consuming surplus electrical energy generated by regenerative braking of a motor, so that auxiliary braking force is additionally generated in a response to the regenerative braking of the motor.

15. The cooling method of claim 9, wherein the cooling system includes:
the retarder radiator configured for cooling thermal energy generated during an operation of the retarder of the vehicle;
a first cooling fluid supply line connected to an outlet side of the retarder and an inlet side of the retarder radiator;
the first cooling fluid discharge line connected to an outlet side of the retarder radiator and the inlet side of the retarder;
the retarder cooling fluid temperature sensor mounted on the first cooling fluid discharge line;
a three-way valve mounted on the first cooling fluid discharge line, between the retarder cooling fluid temperature sensor and the retarder;
the heat exchanger enabling the cooling fluid to circulate from the stack cooling system;
a first cooling fluid branch line connected to the three-way valve and an inlet of the heat exchanger; and
a first cooling fluid return line connected to an outlet of the heat exchanger and a portion of the first cooling fluid discharge line between the three-way valve and the retarder.

16. The cooling method of claim 15, wherein the stack cooling system includes:
a stack radiator and an electric fan configured for cooling stack cooling fluid to cool a fuel cell stack of the vehicle;
a third cooling fluid supply line connected to an outlet side of the fuel cell stack and an inlet side of the stack radiator;
an electric pump mounted on the third cooling fluid supply line;
a third cooling fluid discharge line connected to an outlet side of the stack radiator and to an inlet side of the fuel cell stack;
a second cooling fluid branch line branched from the third cooling fluid discharge line and connected to the heat exchanger; and
a second cooling fluid return line connected to the heat exchanger and the third cooling fluid supply line.

17. The cooling method of claim 9, wherein the retarder cooling controller includes:
a processor; and
a non-transitory storage medium on which a program for performing the cooling method of claim 9 is recorded and executed by the processor.

* * * * *